United States Patent
Liu et al.

(10) Patent No.: US 11,531,678 B2
(45) Date of Patent: Dec. 20, 2022

(54) RECOMMENDATIONS FROM COMMENTS ON ONLINE SOCIAL NETWORKS

(71) Applicant: Meta Platforms, Inc., Menlo Park, CA (US)

(72) Inventors: Jin Liu, Fremont, CA (US); Erica Jean Virtue, Shelter Island Heights, NY (US); Gregory Paul Whalin, Putnam Valley, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 353 days.

(21) Appl. No.: 16/570,983

(22) Filed: Sep. 13, 2019

(65) Prior Publication Data

US 2020/0012639 A1    Jan. 9, 2020

Related U.S. Application Data

(63) Continuation of application No. 15/139,028, filed on Apr. 26, 2016, now Pat. No. 10,452,671.

(51) Int. Cl.
| | | |
|---|---|---|
| G06F 16/00 | (2019.01) |
| G06F 16/248 | (2019.01) |
| G06F 16/44 | (2019.01) |
| G06F 16/2457 | (2019.01) |
| G06Q 10/00 | (2012.01) |
| G06F 16/33 | (2019.01) |
| G06F 16/9535 | (2019.01) |
| G06Q 30/02 | (2012.01) |
| G06Q 50/00 | (2012.01) |

(Continued)

(52) U.S. Cl.
CPC ...... *G06F 16/248* (2019.01); *G06F 16/24578* (2019.01); *G06F 16/3331* (2019.01); *G06F 16/444* (2019.01); *G06F 16/9535* (2019.01); *G06F 40/205* (2020.01); *G06F 40/30* (2020.01); *G06Q 10/00* (2013.01); *G06Q 30/0282* (2013.01); *G06Q 50/01* (2013.01)

(58) Field of Classification Search
None
See application file for complete search history.

(56) References Cited

U.S. PATENT DOCUMENTS

| | | |
|---|---|---|
| 5,918,014 A | 6/1999 | Robinson |
| 6,539,232 B2 | 3/2003 | Hendrey |
| 6,957,184 B2 | 10/2005 | Schmid |

(Continued)

*Primary Examiner* — Hasanul Mobin
(74) *Attorney, Agent, or Firm* — Baker Botts L.L.P.

(57) ABSTRACT

In one embodiment, a method includes, by a client system of a user of an online social network, sending, to one or more computing devices of the online social network, a text post inputted by the user. The text post is associated with a query. The method includes receiving, from the one or more computing devices in response to the text post, an initial recommendation list. The initial recommendation list includes references to one or more objects referenced in comments associated with one or more prior posts associated with the query. The method includes sending, to the one or more computing devices, a request for updates to the initial recommendation list. Moreover, the method includes receiving, from the one or more computing devices in response to the request, an updated recommendation list comprising references to one or more objects referenced in comments associated with the text post.

19 Claims, 10 Drawing Sheets

(51) Int. Cl.
  *G06F 40/30* (2020.01)
  *G06F 40/205* (2020.01)

(56) References Cited

U.S. PATENT DOCUMENTS

| | | |
|---|---|---|
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1* | 5/2012 | Narayanan ........ G06F 16/24578 707/798 |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,832,191 B1* | 9/2014 | LeBeau ................. H04L 51/00 709/204 |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 9,378,287 B2 | 6/2016 | Frey |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2006/0288000 A1* | 12/2006 | Gupta .................. G06F 16/9535 707/999.005 |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191364 A1* | 8/2011 | LeBeau ............... G06F 16/3338 707/E17.014 |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0010939 A1 | 1/2012 | Krishnamoorthy |
| 2012/0042020 A1 | 2/2012 | Kolari |
| 2012/0047147 A1 | 2/2012 | Redstone |
| 2012/0059708 A1 | 3/2012 | Galas |
| 2012/0078906 A1 | 3/2012 | Anand |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0209842 A1* | 8/2012 | Bettridge ........... G06Q 30/0631 707/812 |
| 2012/0221581 A1 | 8/2012 | Narayanan |
| 2012/0223951 A1* | 9/2012 | Dunn .................... H04L 51/52 345/467 |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |

(56) References Cited

U.S. PATENT DOCUMENTS

| | | |
|---|---|---|
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0159406 A1 | 6/2013 | Chand |
| 2013/0191372 A1 | 7/2013 | Lee |
| 2013/0191416 A1* | 7/2013 | Lee .................. G06F 16/2457 707/771 |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254155 A1 | 9/2013 | Thollot |
| 2013/0254305 A1 | 9/2013 | Cheng |
| 2014/0006416 A1 | 1/2014 | Leslie |
| 2014/0040245 A1* | 2/2014 | Rubinstein ............ G06Q 50/01 707/769 |
| 2014/0067535 A1 | 3/2014 | Rezaei |
| 2014/0122465 A1 | 5/2014 | Bilinski |
| 2014/0122522 A1* | 5/2014 | Ganapathy ............ G06Q 50/01 707/769 |
| 2014/0152666 A1 | 6/2014 | Deng |
| 2014/0365484 A1* | 12/2014 | Freeman ................ H04W 4/21 707/736 |
| 2015/0149484 A1* | 5/2015 | Kelley ............... G06Q 30/0278 707/748 |
| 2015/0161519 A1 | 6/2015 | Zhong |
| 2015/0281163 A1* | 10/2015 | Bastide ................ G06Q 10/10 709/206 |
| 2015/0294358 A1* | 10/2015 | Galadari ........... G06Q 30/0257 705/14.55 |
| 2016/0012514 A1* | 1/2016 | Brown ............... G06Q 30/0635 705/26.81 |
| 2016/0026727 A1 | 1/2016 | Bar-Yossef |
| 2016/0042069 A1* | 2/2016 | Lee-Goldman ........ G06Q 50/00 707/706 |
| 2017/0024765 A1* | 1/2017 | Barenholz .......... G06Q 30/0255 |
| 2017/0046802 A1 | 2/2017 | Zhang |
| 2017/0048664 A1 | 2/2017 | Zhang |
| 2017/0169475 A1* | 6/2017 | Korpusik ........... G06Q 30/0269 |
| 2017/0206271 A1 | 7/2017 | Jain |
| 2017/0302610 A1* | 10/2017 | Naidu .................. H04L 51/216 |

* cited by examiner

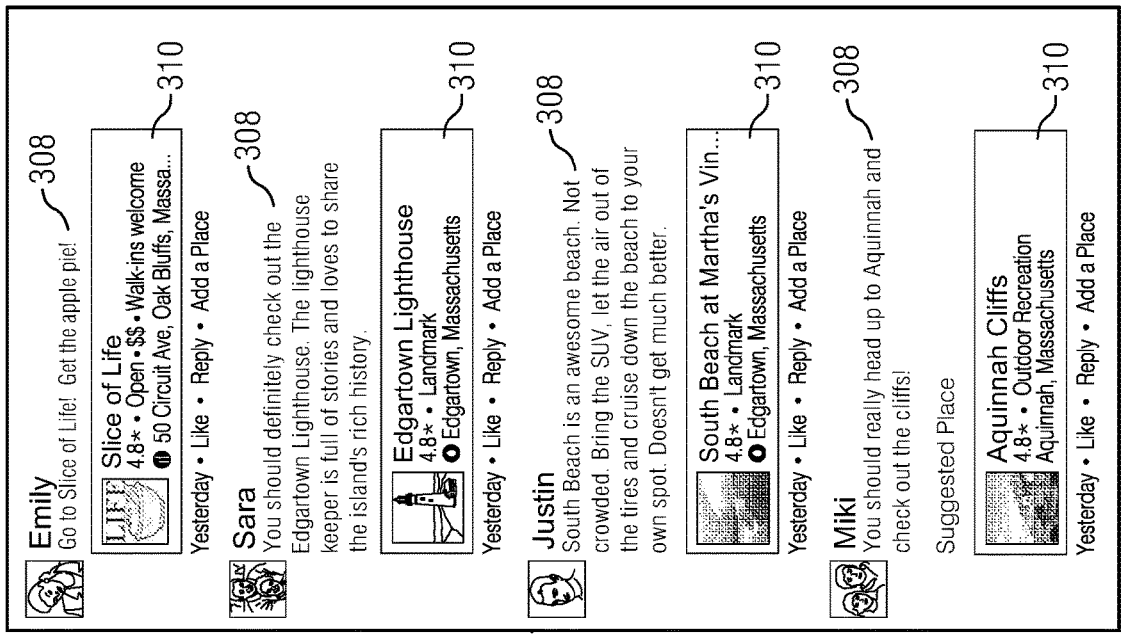
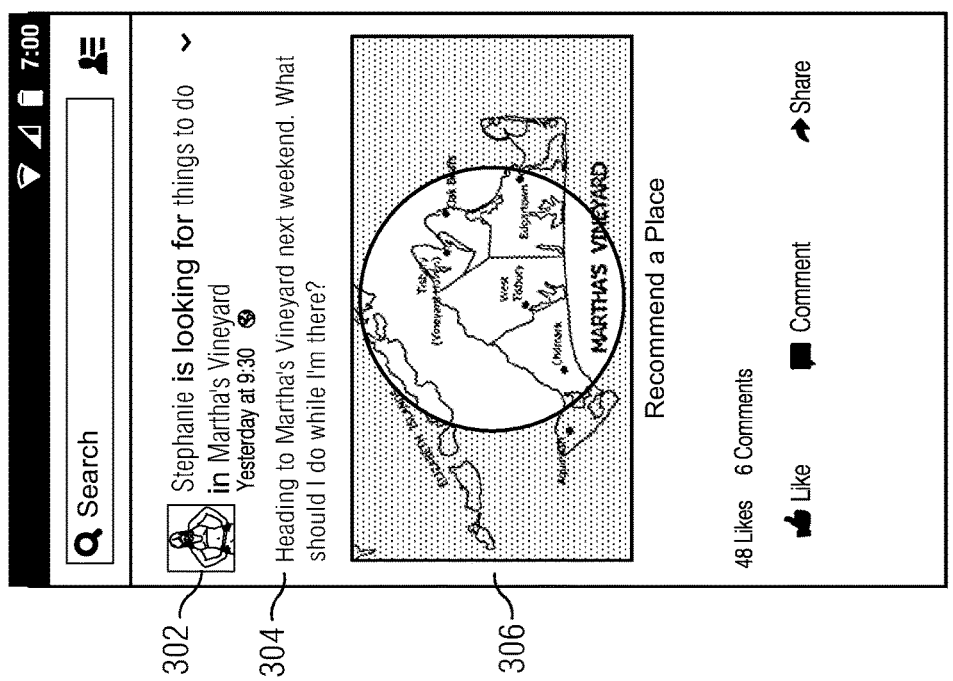
*FIG. 3B*
*FIG. 3A*

FIG. 8

RECOMMENDATIONS FROM COMMENTS ON ONLINE SOCIAL NETWORKS

PRIORITY

This application is a continuation under 35 U.S.C. § 120 of U.S. patent application Ser. No. 15/139,028, filed 26 Apr. 2016, which is incorporated herein by reference.

TECHNICAL FIELD

This disclosure generally relates to social graphs and generating content within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, the social-networking system may receive a text post inputted by a user of an online social network and parse the text post to identify a query associated with the post. The query may be a request by the user for recommendations about, for example, a place, activity, service, event, etc. For example, a user may post to the online social network asking others for thing-to-do in a city, e.g., "I'm going to Barcelona next week, what should I do there?" The social-networking system may then receive one or more comments from other users responding to the post with particular recommendations, and may identify objects of the online social network associated with the recommendations. For example, a friend of the user may reply to the post with a comment that says "You should visit Parc Guell. It's lovely!" The social-networking system may parse this comment and determine that the commenter is providing a recommendation for the Parc Guell in Barcelona, Spain, which corresponds to a particular profile page of the online social network. The social-networking system may then generate a recommendation list including references to the identified objects which the users can interact with in the online social network. For example, in response to the recommendations provided by the querying user's friends, the social-networking system may generate a recommendation list for "Things to do in Barcelona," which includes reference to the Parc Guell and other places recommended by the user's friends in the comments to the post.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 3A and 3B illustrate an example graphical interface for requesting recommendations in a social-networking system, according to particular embodiments.

FIG. 8 illustrates an example graphical interface for displaying default recommendations, according to particular embodiments.

DESCRIPTION OF EXAMPLE EMBODIMENTS

System Overview

Figure 1:
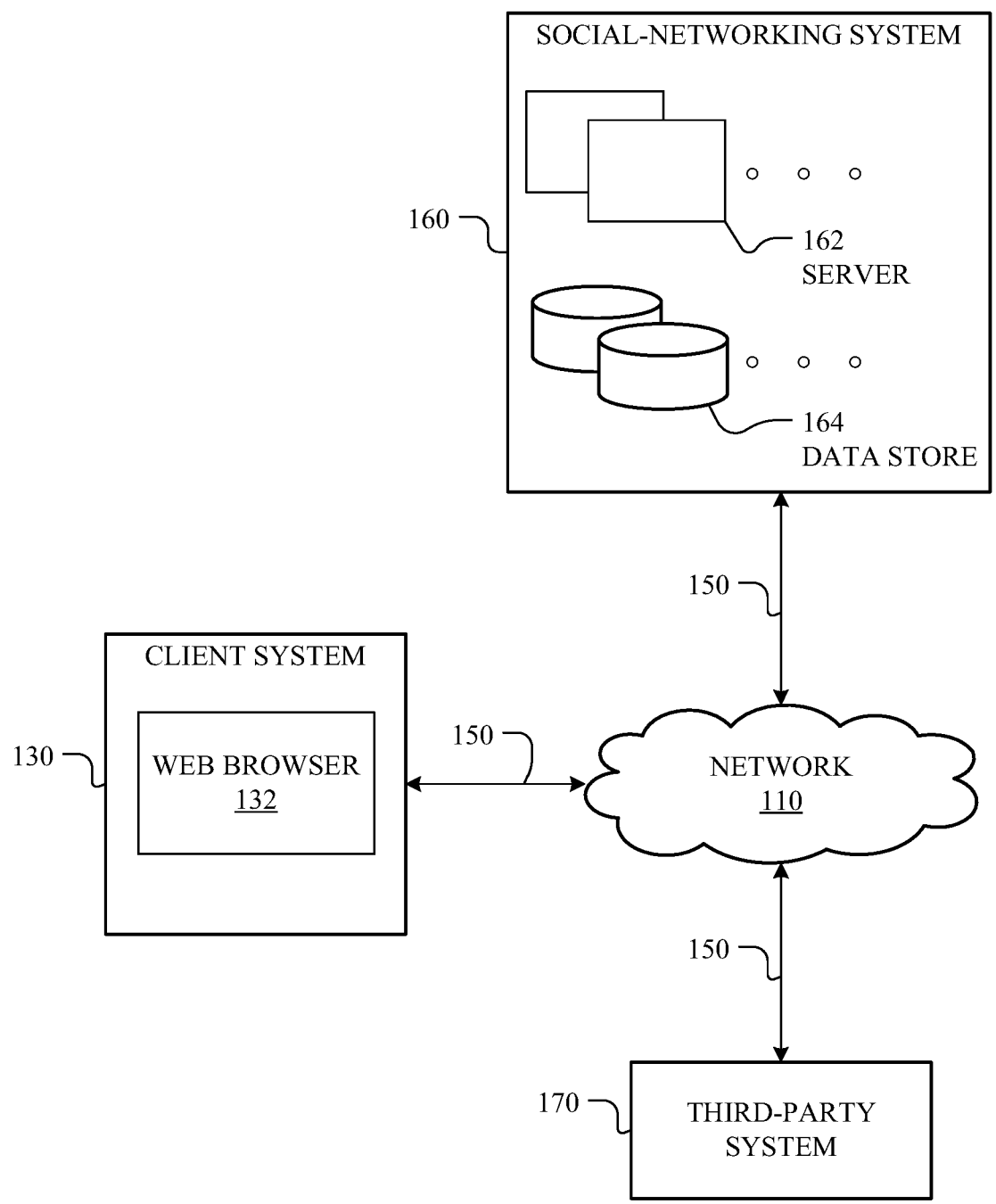
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of a client system 130, a social-networking system 160, a third-party system 170, and a network 110, this disclosure contemplates any suitable arrangement of a client system 130, a social-networking system 160, a third-party system 170, and a network 110. As an example and not by way of limitation, two or more of a client system 130, a social-networking system 160, and a third-party system 170 may be connected to each other directly, bypassing a network 110. As another example, two or more of a client system 130, a social-networking system 160, and a third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client systems 130, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
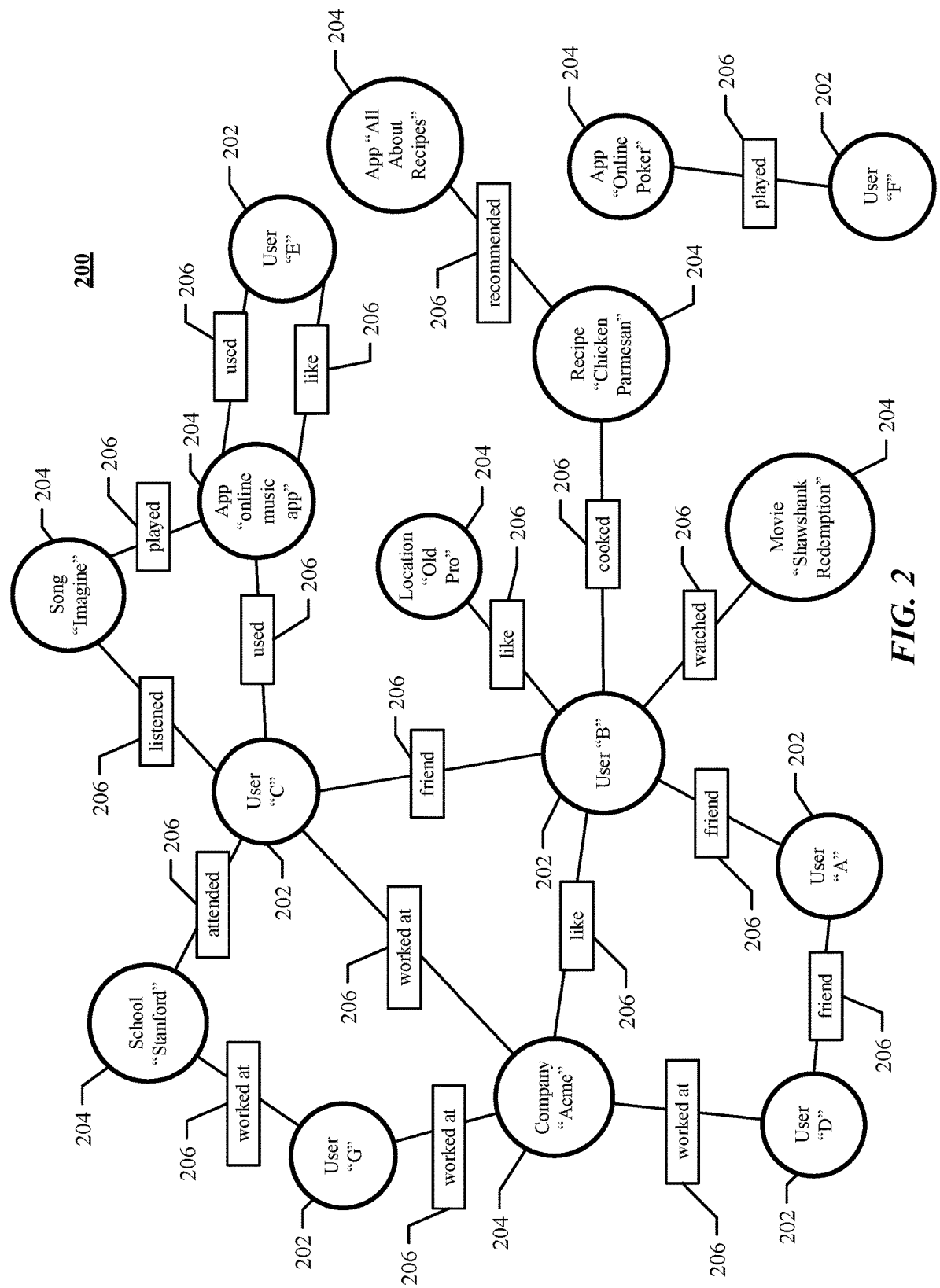
FIG. 2 illustrates an example social graph.

FIG. 2 illustrates an example social graph 200. In particular embodiments, the social-networking system 160 may store one or more social graphs 200 in one or more data stores. In particular embodiments, the social graph 200 may include multiple nodes—which may include multiple user nodes 202 or multiple concept nodes 204—and multiple edges 206 connecting the nodes. The example social graph 200 illustrated in FIG. 2 is shown, for didactic purposes, in a two-dimensional visual map representation. In particular embodiments, a social-networking system 160, a client system 130, or a third-party system 170 may access the social graph 200 and related social-graph information for suitable applications. The nodes and edges of the social graph 200 may be stored as data objects, for example, in a data store (such as a social-graph database). Such a data store may include one or more searchable or queryable indexes of nodes or edges of the social graph 200.

In particular embodiments, a user node 202 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with the social-networking system 160. In particular embodiments, a user node 202 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more web interfaces.

In particular embodiments, a concept node 204 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more web interfaces.

In particular embodiments, a node in the social graph 200 may represent or be represented by a web interface (which may be referred to as a "profile interface"). Profile interfaces may be hosted by or accessible to the social-networking system 160. Profile interfaces may also be hosted on third-party websites associated with a third-party server 170. As an example and not by way of limitation, a profile interface corresponding to a particular external web interface may be the particular external web interface and the profile interface may correspond to a particular concept node 204. Profile interfaces may be viewable by all or a selected subset of other users. As an example and not by way of limitation, a user node 202 may have a corresponding user-profile interface in which the corresponding user may add content, make declarations, or otherwise express himself or herself. As another example and not by way of limitation, a concept node 204 may have a corresponding concept-profile interface in which one or more users may add content, make declarations, or express themselves, particularly in relation to the concept corresponding to concept node 204.

In particular embodiments, a concept node 204 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 202 corresponding to the user and a concept node 204 corresponding to the third-party web interface or resource and store edge 206 in one or more data stores.

In particular embodiments, a pair of nodes in the social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 206 connecting the first user's user node 202 to the second user's user node 202 in the social graph 200 and store edge 206 as social-graph information in one or more of data stores 164. In the example of FIG. 2, the social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile interface corresponding to a concept node 204 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (a third-party online music application). In this case, the social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, the social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (the third-party online music application) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "online music application").

In particular embodiments, the social-networking system 160 may create an edge 206 between a user node 202 and a concept node 204 in the social graph 200. As an example and not by way of limitation, a user viewing a concept-profile interface (such as, for example, by using a web browser or a special-purpose application hosted by the user's client system 130) may indicate that he or she likes the concept represented by the concept node 204 by clicking or selecting a "Like" icon, which may cause the user's client system 130 to send to the social-networking system 160 a message indicating the user's liking of the concept associated with the concept-profile interface. In response to the message, the social-networking system 160 may create an edge 206 between user node 202 associated with the user and concept node 204, as illustrated by "like" edge 206 between the user and concept node 204. In particular embodiments, the social-networking system 160 may store an edge 206 in one or more data stores. In particular embodiments, an edge 206 may be automatically formed by the social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Search Queries on Online Social Networks

In particular embodiments, a user may submit a query to the social-networking system 160 by, for example, selecting a query input or inputting text into query field. A user of an online social network may search for information relating to a specific subject matter (e.g., users, concepts, external content or resource) by providing a short phrase describing the subject matter, often referred to as a "search query," to a search engine. The query may be an unstructured text query and may comprise one or more text strings (which may include one or more n-grams). In general, a user may input any character string into a query field to search for content on the social-networking system 160 that matches the text query. The social-networking system 160 may then search a data store 164 (or, in particular, a social-graph database) to identify content matching the query. The search engine may conduct a search based on the query phrase using various search algorithms and generate search results that identify resources or content (e.g., user-profile interfaces, content-profile interfaces, or external resources) that are most likely to be related to the search query. To conduct a search, a user may input or send a search query to the search engine. In response, the search engine may identify one or more resources that are likely to be related to the search query, each of which may individually be referred to as a "search result," or collectively be referred to as the "search results" corresponding to the search query. The identified content may include, for example, social-graph elements (i.e., user nodes 202, concept nodes 204, edges 206), profile interfaces, external web interfaces, or any combination thereof. The social-networking system 160 may then generate a search-results interface with search results corresponding to the identified content and send the search-results interface to the user. The search results may be presented to the user, often in the form of a list of links on the search-results interface, each link being associated with a different interface that contains some of the identified resources or content. In particular embodiments, each link in the search results may be in the form of a Uniform Resource Locator (URL) that specifies where the corresponding interface is located and the mechanism for retrieving it. The social-networking system 160 may then send the search-results interface to the web browser 132 on the user's client system 130. The user may then click on the URL links or otherwise select the content from the search-results interface to access the content from the social-networking system 160 or from an external system (such as, for example, a third-party system 170), as appropriate. The resources may be ranked and presented to the user according to their relative degrees of relevance to the search query. The search results may also be ranked and presented to the user according to their relative degree of relevance to the user. In other words, the search results may be personalized for the querying user based on, for example, social-graph information, user information, search or browsing history of the user, or other suitable information related to the user. In particular embodiments, ranking of the resources may be determined by a ranking algorithm implemented by the search engine. As an example and not by way of limitation, resources that are more relevant to the search query or to the user may be ranked higher than the resources that are less relevant to the search query or the user. In particular embodiments, the search engine may limit its search to resources and content on the online social network. However, in particular embodiments, the search engine may also search for resources or contents on other sources, such as a third-party system 170, the internet or World Wide Web, or other suitable sources. Although this disclosure describes querying the social-networking system 160 in a particular manner, this disclosure contemplates querying the social-networking system 160 in any suitable manner.

Typeahead Processes and Queries

In particular embodiments, one or more client-side and/or backend (server-side) processes may implement and utilize a "typeahead" feature that may automatically attempt to match social-graph elements (e.g., user nodes 202, concept nodes 204, or edges 206) to information currently being entered by a user in an input form rendered in conjunction with a requested interface (such as, for example, a user-profile interface, a concept-profile interface, a search-results interface, a user interface/view state of a native application associated with the online social network, or another suitable interface of the online social network), which may be hosted by or accessible in the social-networking system 160. In particular embodiments, as a user is entering text to make a declaration, the typeahead feature may attempt to match the string of textual characters being entered in the declaration to strings of characters (e.g., names, descriptions) corresponding to users, concepts, or edges and their corresponding elements in the social graph 200. In particular embodiments, when a match is found, the typeahead feature may automatically populate the form with a reference to the social-graph element (such as, for example, the node name/type, node ID, edge name/type, edge ID, or another suitable reference or identifier) of the existing social-graph element. In particular embodiments, as the user enters characters into a form box, the typeahead process may read the string of entered textual characters. As each keystroke is made, the frontend-typeahead process may send the entered character string as a request (or call) to the backend-typeahead process executing within the social-networking system 160. In particular embodiments, the typeahead process may use one or more matching algorithms to attempt to identify matching social-graph elements. In particular embodiments, when a match or matches are found, the typeahead process may send a response to the user's client system 130 that may include, for example, the names (name strings) or descriptions of the matching social-graph elements as well as, potentially, other metadata associated with the matching social-graph elements. As an example and not by way of limitation, if a user enters the characters "pok" into a query field, the typeahead process may display a drop-down menu that displays names of matching existing profile interfaces and respective user nodes 202 or concept nodes 204, such as a profile interface named or devoted to "poker" or "poke," which the user can then click on or otherwise select thereby confirming the desire to declare the matched user or concept name corresponding to the selected node.

More information on typeahead processes may be found in U.S. patent application Ser. No. 12/763,162, filed 19 Apr. 2010, and U.S. patent application Ser. No. 13/556,072, filed 23 Jul. 2012, which are incorporated by reference.

In particular embodiments, the typeahead processes described herein may be applied to search queries entered by a user. As an example and not by way of limitation, as a user enters text characters into a query field, a typeahead process may attempt to identify one or more user nodes 202, concept nodes 204, or edges 206 that match the string of characters entered into the query field as the user is entering the characters. As the typeahead process receives requests or calls including a string or n-gram from the text query, the typeahead process may perform or cause to be performed a search to identify existing social-graph elements (i.e., user nodes 202, concept nodes 204, edges 206) having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays names of matching existing profile interfaces and respective user nodes 202 or concept nodes 204, and displays names of matching edges 206 that may connect to the matching user nodes 202 or concept nodes 204, which the user can then click on or otherwise select thereby confirming the desire to search for the matched user or concept name corresponding to the selected node, or to search for users or concepts connected to the matched users or concepts by the matching edges. Alternatively, the typeahead process may simply auto-populate the form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and edges, the typeahead process may send a request that informs the social-networking system 160 of the user's confirmation of a query containing the matching social-graph elements. In response to the request sent, the social-networking system 160 may automatically (or alternately based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner.

In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, which are incorporated by reference.

Structured Search Queries

In particular embodiments, in response to a text query received from a first user (i.e., the querying user), the social-networking system 160 may parse the text query and identify portions of the text query that correspond to particular social-graph elements. However, in some cases a query may include one or more terms that are ambiguous, where an ambiguous term is a term that may possibly correspond to multiple social-graph elements. To parse the ambiguous term, the social-networking system 160 may access a social graph 200 and then parse the text query to identify the social-graph elements that corresponded to ambiguous n-grams from the text query. The social-networking system 160 may then generate a set of structured queries, where each structured query corresponds to one of the possible matching social-graph elements. These structured queries may be based on strings generated by a grammar model, such that they are rendered in a natural-language syntax with references to the relevant social-graph elements. As an example and not by way of limitation, in response to the text query, "show me friends of my girlfriend," the social-networking system 160 may generate a structured query "Friends of Stephanie," where "Friends" and "Stephanie" in the structured query are references corresponding to particular social-graph elements. The reference to "Stephanie" would correspond to a particular user node 202 (where the social-networking system 160 has parsed the n-gram "my girlfriend" to correspond with a user node 202 for the user "Stephanie"), while the reference to "Friends" would correspond to friend-type edges 206 connecting that user node 202 to other user nodes 202 (i.e., edges 206 connecting to "Stephanie's" first-degree friends). When executing this structured query, the social-networking system 160 may identify one or more user nodes 202 connected by friend-type edges 206 to the user node 202 corresponding to "Stephanie". As another example and not by way of limitation, in response to the text query, "friends who work at facebook," the social-networking system 160 may generate a structured query "My friends who work at Facebook," where "my friends," "work at," and "Facebook" in the structured query are references corresponding to particular social-graph elements as described previously (i.e., a friend-type edge 206, a work-at-type edge 206, and concept node 204 corresponding to the company "Facebook"). By providing suggested structured queries in response to a user's text query, the social-networking system 160 may provide a powerful way for users of the online social network to search for elements represented in the social graph 200 based on their social-graph attributes and their relation to various social-graph elements. Structured queries may allow a querying user to search for content that is connected to particular users or concepts in the social graph 200 by particular edge-types. The structured queries may be sent to the first user and displayed in a drop-down menu (via, for example, a client-side typeahead process), where the first user can then select an appropriate query to search for the desired content. Some of the advantages of using the structured queries described herein include finding users of the online social network based upon limited information, bringing together virtual indexes of content from the online social network based on the relation of that content to various social-graph elements, or finding content related to you and/or your friends. Although this disclosure describes generating particular structured queries in a particular manner, this disclosure contemplates generating any suitable structured queries in any suitable manner.

More information on element detection and parsing queries may be found in U.S. patent application Ser. No. 13/556,072, filed 23 Jul. 2012, U.S. patent application Ser. No. 13/731,866, filed 31 Dec. 2012, and U.S. patent application Ser. No. 13/732,101, filed 31 Dec. 2012, each of which is incorporated by reference. More information on structured search queries and grammar models may be found in U.S. patent application Ser. No. 13/556,072, filed 23 Jul. 2012, U.S. patent application Ser. No. 13/674,695, filed 12 Nov. 2012, and U.S. patent application Ser. No. 13/731,866, filed 31 Dec. 2012, each of which is incorporated by reference.

Generating Keywords and Keyword Queries

In particular embodiments, the social-networking system 160 may provide customized keyword completion suggestions to a querying user as the user is inputting a text string into a query field. Keyword completion suggestions may be provided to the user in a non-structured format. In order to generate a keyword completion suggestion, the social-networking system 160 may access multiple sources within the social-networking system 160 to generate keyword completion suggestions, score the keyword completion suggestions from the multiple sources, and then return the keyword completion suggestions to the user. As an example and not by way of limitation, if a user types the query "friends stan," then the social-networking system 160 may suggest, for example, "friends stanford," "friends stanford university," "friends stanley," "friends stanley cooper," "friends stanley kubrick," "friends stanley cup," and "friends stanlonski." In this example, the social-networking system 160 is suggesting the keywords which are modifications of the ambiguous n-gram "stan," where the suggestions may be generated from a variety of keyword generators. The social-networking system 160 may have selected the keyword completion suggestions because the user is connected in some way to the suggestions. As an example and not by way of limitation, the querying user may be connected within the social graph 200 to the concept node 204 corresponding to Stanford University, for example by like- or attended-type edges 206. The querying user may also have a friend named Stanley Cooper. Although this disclosure describes generating keyword completion suggestions in a particular manner, this disclosure contemplates generating keyword completion suggestions in any suitable manner.

More information on keyword queries may be found in U.S. patent application Ser. No. 14/244,748, filed 3 Apr. 2014, U.S. patent application Ser. No. 14/470,607, filed 27 Aug. 2014, and U.S. patent application Ser. No. 14/561,418, filed 5 Dec. 2014, each of which is incorporated by reference.

Recommendations from Post Comments

In particular embodiments, a user of an online social network may create a post on the online social network requesting recommendations for, by way of example, locations, activities, or services. As an example and not by way of limitation, a user may post to the online social network asking others for thing-to-do in a city, e.g., "I'm going to Barcelona next week, what should I do there?" The user's friends on the online social network may then respond with suggestions in the post's comments section. However, these recommendations from the user's friends on the online social network may be provided in an unstructured way, and may require the querying user to perform numerous subsequent queries on each recommendation to get more information. Thus, it would be useful if the online social network could provide a structured, easy-to-use interface for a user to review and explore recommendations provided in response to a query in their posts.

In particular embodiments, the social-networking system 160 may generate a list of recommendations for a querying user based on a post by the querying user and associated comments by other users. A user of social-networking system 160 may create a post on the online social network requesting recommendations regarding, for example, a place, an activity, a service, an event, etc. The social-networking system 160 may parse user posts to detect when the post is asking for a recommendation, and convert the post into a recommendation list. The social-networking system 160 may then parse comments submitted in response to the post to detect particular recommendations, and may identify objects that are associated with the recommendation to form part of the list. As an example and not by way of limitation, a user may create a post to the online social network asking others for things-to-do in a city, e.g., "I'm going to Barcelona next week, what should I do there?" The user's friends on the online social network may respond with suggestions in the post's comments section, and the social-networking system 160 may parse the comments to generate a recommendation list for "Things To Do in Barcelona." The recommendation list may be displayed with complementary information and functionality related to the identified recommended objects, such as ratings, reviews, a map displaying locations of the objects, etc. Although this disclosure describes generating particular lists of recommendations in a particular manner, this disclosure contemplates generating any suitable lists of recommendations in any suitable manner.

In particular embodiments, the social-networking system 160 may receive, from a client system of a first user of an online social network, a text post inputted by the first user. The user may enter the text post using a composer interface of a webpage or application associated with the online social network, or in any other manner suitable for social-networking system 160. As an example and not by way of limitation, FIG. 3A illustrates a user typed and submitted a text post reading "Heading to Martha's Vineyard next weekend! What should I do while I'm there?" Although this disclosure describes receiving particular posts from users in a particular manner, this disclosure contemplates receiving any suitable posts from users in any suitable manner.

Figure 4B:
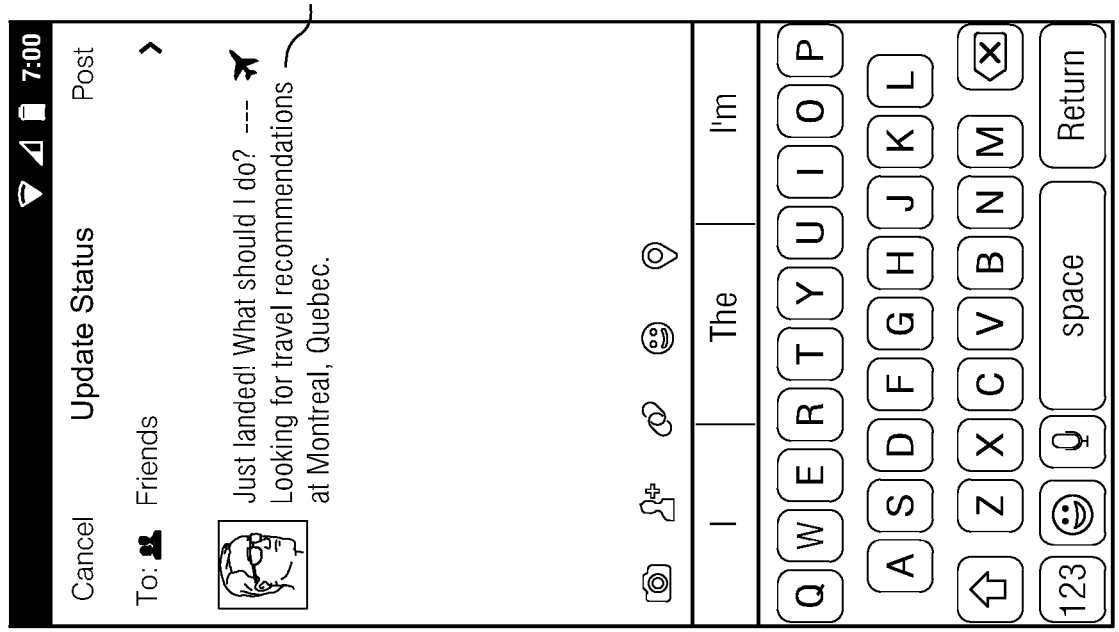
FIGS. 4A and 4B illustrate an example graphical interface for requesting recommendations in a social-networking system, according to particular embodiments.
Figure 4A:
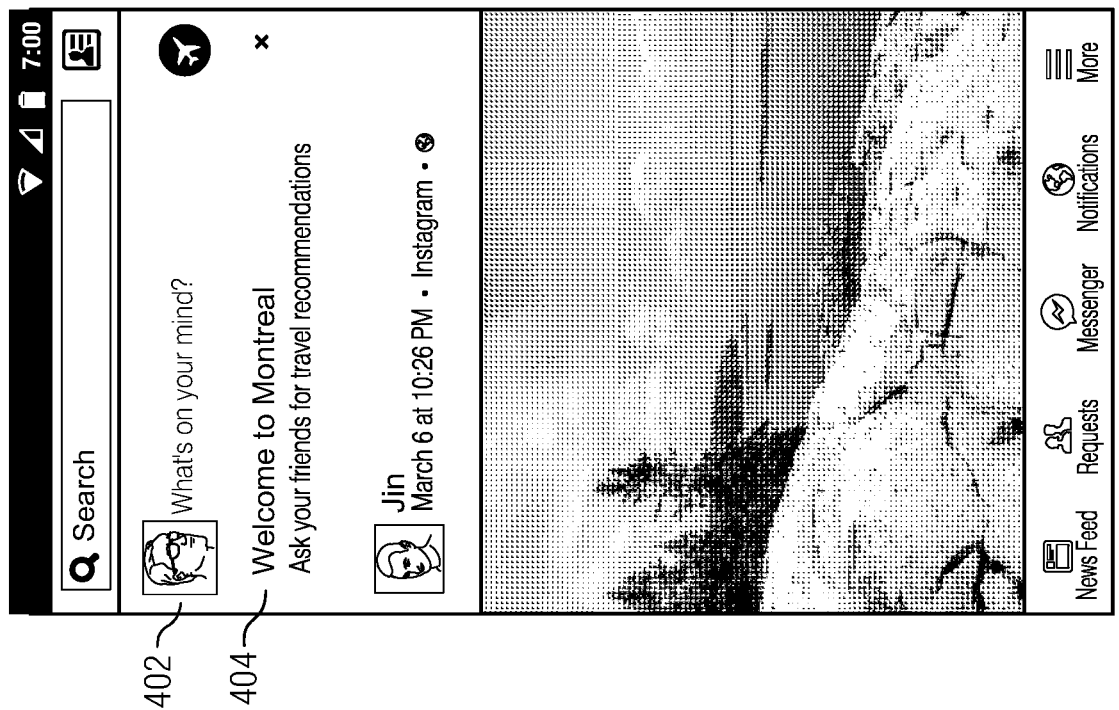

In particular embodiments, the social-networking system 160 may detect that a user is located in a particular geographic location and prompt the user to ask for recommendations related to the geographic location. As an example, FIG. 4A illustrates a scenario where a user has logged into the social-networking system 160 from Montreal. In response, the social-networking system 160 may provide a suggestion 404 that the user ask friends on the online social network for travel recommendations ("Ask your friends for travel recommendations"), and an option for the user to identify the post as a request for recommendations. The social-networking system 160 may then format the text post to indicate to other users that the posting user is looking for recommendations, as illustrated by the text post 406. Although this disclosure describes prompting users to ask for recommendations in a particular manner, this disclosure contemplates prompting users to ask for recommendations in any suitable manner.

In particular embodiments, the social-networking system 160 may parse the text of the post to identify a query associated with the post. The parsing of the text of the post may be performed using any suitable methods or systems, such as, for example, using a natural-language parser, machine-learning classifying techniques, a probabilistic language model, an n-gram model, a segmental Markov model, a grammar-language model, other suitable parsing methods or systems, or any combination thereof. As an example and not by way of limitation, the social-networking system 160 may use a natural-language parser to analyze the text of the post reading "Heading to Martha's Vineyard next weekend! What should I do while I'm there?" Based on the presence of the question mark in the text of the post and the interrogative "what", the natural-language parser may identify the post as being associated with a query requesting recommendations from others. In connection with parsing text to identify a query, particular embodiments may utilize one or more systems, components, elements, functions, methods, operations, or steps disclosed in U.S. patent application Ser. No. 14/455,798, filed 8 Aug. 2014 and U.S. patent application Ser. No. 15/002,226, filed 20 Jan. 2016, each of which is incorporated by reference. Although this disclosure describes parsing text in a particular manner, this disclosure contemplates parsing text in any suitable any suitable manner.

In particular embodiments, the social-networking system 160 may calculate a degree of confidence that the text post is associated with the query. Based on an analysis of the text, the parser may determine a likelihood or probability of what specifically the user is requesting (e.g., object-type, specific objects referenced in the query). Then, when the degree of confidence is above a threshold, the social-networking system 160 may identify the particular query. In particular embodiments, the analysis also takes into account other information in addition to the text, such as, for example, a social context of the post, or the text of comments responsive to the post. As an example and not by way of limitation, if the post is associated with the user Checking-in to Montreal, the social-networking system 160 may increase its confidence that the user is asking for recommendations about Montreal. The calculated degree of confidence may be, for example, a confidence score, a probability, a quality, a ranking, another suitable type of score, or any combination thereof. As an example and not by way of limitation, the social-networking system 160 may determine a probability score (also referred to simply as a "probability") that the text post corresponds to a query. The probability score may indicate the level of similarity or relevance between the text post and particular query grammar structures. There may be many different ways to calculate the probability. The present disclosure contemplates any suitable method to calculate a probability score for query identified in a text post. In particular embodiments, the social-networking system 20 may determine a probability, p, that text post is associated with a particular query. The probability, p, may be calculated as the probability of corresponding to a particular query, q, given a particular text post, X. In other words, the probability may be calculated as $p=(q|X)$. As an example and not by way of limitation, a probability that a text post is associated with a particular query may calculated as an probability score denoted as $p_{i,j,q}$. The input may be a text post $X=(x_1, x_2, \ldots, x_N)$, and a set of classes. For each (i:j) and a class q, the social-networking system 160 may compute $p_{i,j,q}=p(\text{class}(x_{i:j})=q|X)$. In particular embodiments, if the degree of confidence is above the threshold, the social-networking system 160 may then transform the post into a recommendation list type of post. The social-networking system 160 may transform the post into a recommendation list automatically, or alternatively only after prompting the user for a confirmation or approval to transform the post into a recommendation list (e.g., "Do you want to create a list of things-to-do in Barcelona, Spain?" In particular embodiments, the social-networking system 160 may send a confirmation prompt for the first user to verify the identified query. As an example and not by way of limitation, if the degree of confidence is less than or equal to a particular threshold confidence, the social-networking system 160 may prompt the user, asking the user to confirm if it is requesting something in particular (e.g., "Are you asking for recommendations of things-to-do in Barcelona, Spain?"). In particular embodiments, the social-networking system may use a reaction-card type functionality, as disclosed in U.S. patent application Ser. No. 14/466,269, filed 22 Aug. 2014, and which is incorporated by reference. Although this disclosure describes determining what specifically a user is requesting in a particular manner, this disclosure contemplates determining what specifically a user is requesting in any suitable manner.

In particular embodiments, the parser may also use comments associated with the post as part of its analysis of the text to confirm the determination that the post is a request for recommendations. As an example and not by way of limitation, to determine if the text post "I'm going to Barcelona next week, what should I do there?" is a query, the social-networking system 160 may analyze comments on the post to determine if they are related to geographic locations in Barcelona, and if so the parser may increase its confidence that the original post was a request for recommended locations in Barcelona. Although this disclosure describes confirming a determination that a post is a request for recommendations in a particular manner, this disclosure contemplates confirming a determination that a post is a request for recommendations in any suitable manner.

In particular embodiments, the user may explicitly signal that a post is asking for recommendations, for example, through a user interface element. The text post inputted by the first user may comprise one or more characters inputted into, for example, a composer interface. As the user types the characters, a typeahead process may parse and identify potential queries for generating recommendation lists. In particular embodiments, the social-networking system 160 may read, by a frontend-typeahead process, the one or more characters as they are inputted into the compose interface and identify, by a backend-typeahead process, one or more potential queries based on the one or more characters. The social-networking system 160 may then send, to the client system 130, a prompt listing one or more of the potential queries to the first user for selection. As an example and not by way of limitation, in response to the user inputting "I'm going to Barcelona next week, what . . . " into a composer interface, the social-networking system 160 may display a few suggested queries as the user types the input, such as a typeahead-like suggestion of "Ask Friends for Things-to-do for Barcelona, Spain" in a drop-down menu adjacent to the composer interface, and allow the user to click on one of the suggestions to generate the post. Although this disclosure describes a user signaling that a post is asking for recommendations in a particular manner, this disclosure contemplates a user signaling that a post is a request for recommendations in any suitable manner.

In particular embodiments, the social-networking system 160 may receive one or more comments responsive to the text post from one or more second users of the online social network. As an example and not by way of limitation, with reference to FIG. 3B, in response to the user posting "Heading to Martha's Vineyard next weekend! What should I do while I'm there?", the posting user's friends on the online social network may post comments 308 in response to the text post, for example, "Go to Slice of Life! Get the apple pie!" Although this disclosure describes receiving comments in a particular manner, this disclosure contemplates receiving comments in any suitable manner.

In particular embodiments, the social-networking system 160 may determine, for each of the one or more received comments, whether the comment includes a recommendation responsive to the query associated with the post. The analysis of the recommendations may be performed using any suitable methods or systems, such as, for example, using a natural-language parser, machine-learning classifying techniques, a probabilistic language model, an n-gram model, a segmental Markov model, a grammar-language model, other suitable parsing methods or systems, or any combination thereof. As an example and not by way of limitation, the social-networking system 160 may use a natural-language parser to analyze the text of the comment "Go to Slice of Life! Get the apple pie!" Based on the reference to a particular location "Slice of Life" and the reference to a particular product "apple pie", the natural-language parser may identify the comment as including a recommendation response to the query in the text post "Heading to Martha's Vineyard next weekend! What should I do while I'm there?" Although this disclosure describes determining whether a comment includes a recommendation in a particular manner, this disclosure contemplates determining whether a comment includes a recommendation in any suitable manner.

In particular embodiments, the social-networking system 160 may identify, for each comment with a responsive recommendation, one or more objects of the online social network associated with the recommendation. As other users add comments, the natural-language parser analyzes the comments to identify what specifically the users are recommending (e.g., specific objects referenced in the comment). The parser may determine that the commenter is recommending a particular place, activity, service, event, etc. (e.g., Parc Guell in Barcelona, Spain) and a degree of confidence that the determination is correct. Then, when the degree of confidence is above a threshold, the social-networking system 160 may identify the particular object. The degree of confidence may be, for example, a confidence score, a probability, a quality, a ranking, another suitable type of score, or any combination thereof. As an example and not by way of limitation, the social-networking system 160 may determine a probability score that the n-gram in a comment corresponds to a social-graph element, such as a user node 302, a concept node 304, or an edge 306 of social graph 300. The probability score may indicate the level of similarity or relevance between the n-gram and a particular social-graph element. There may be many different ways to calculate the probability. The present disclosure contemplates any suitable method to calculate a probability score for an n-gram identified in a search query. In particular embodiments, the social-networking system 160 may determine a probability, p, that an n-gram corresponds to a particular social-graph element. The probability, p, may be calculated as the probability of corresponding to a particular social-graph element, k, given a particular search query, X. In other words, the probability may be calculated as $p=(k|X)$. As an example and not by way of limitation, a probability that an n-gram corresponds to a social-graph element may calculated as an probability score denoted as $p_{i,j,k}$. The input may be a text query $X=(x_i, x_2, \ldots, x_N)$, and a set of classes. For each (i:j) and a class k, the social-networking system 160 may compute $p_{i,j,k}=p(class(x_{i:j})=k|X)$. In particular embodiments, the social-networking system 160 may identify the objects using methods and techniques for detecting social graph elements for structured search queries, as described in U.S. patent application Ser. No. 13/556,072, filed 23 Jul. 2012, which is incorporated by reference. Although this disclosure describes identifying objects of the online social network associated with a recommendation in a particular manner, this disclosure contemplates identifying objects of the online social network associated with a recommendation in any suitable manner.

Figure 5B:
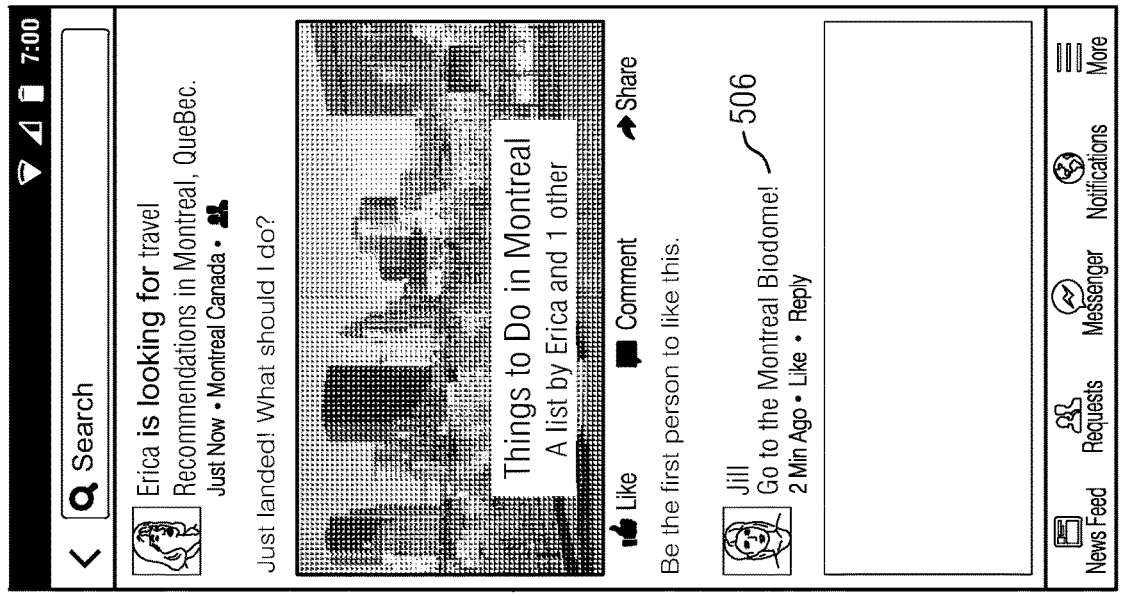
FIGS. 5A and 5B illustrate an example graphical interface for providing recommendations in a social-networking system using type-ahead processes, according to particular embodiments.
Figure 5A:
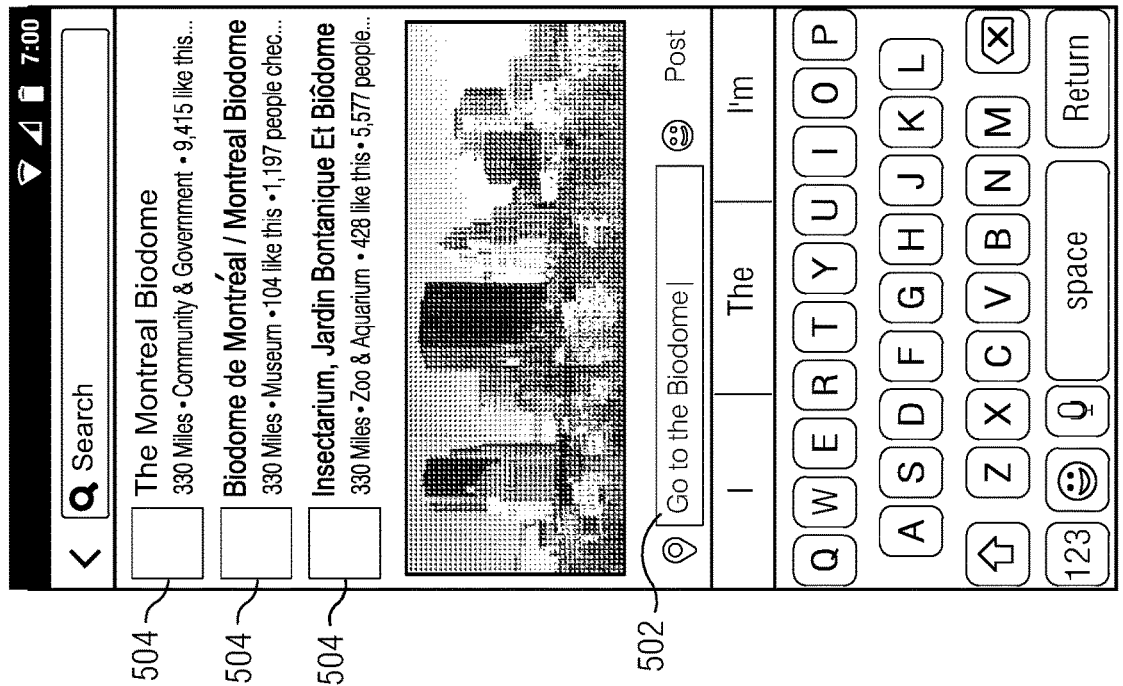

In particular embodiments, a commenting user may specify a specific online social network object that is being recommended. The one or more comments from the one or more second users may comprise one or more characters inputted into, for example, a composer interface. As illustrated in FIG. 5A, as the commenting user types characters 502, a typeahead process may parse and identify potential objects 504 for recommendation. In particular embodiments, the social-networking system 160 may read, by a frontend-typeahead process, the one or more characters as they are inputted into the compose interface and may identify, by a backend-typeahead process, one or more potential objects based on the one or more characters. The social-networking system 160 may then send, to the commenting user, a prompt listing one or more of the potential objects for selection. As an example any not by way of limitation, in response to the user inputting the comment "Go to the Montreal Biodome!" into a composer interface, the social-networking system 160 may display a suggest entities as the user types the input, such as a typeahead-like suggestion of "Montreal Biodome Museum, Montreal, Canada" inline in the composer interface. In particular embodiments, the potential objects may be identified based on their responsiveness to the identified recommendation query. The commenting user may select one of the potential objects to include a reference 506 to the object in the comment, as shown in FIG. 5B. Although this disclosure describes a commenting user recommending particular objects in a particular manner, this disclosure contemplates commenting users recommending any suitable objects in any suitable manner.

In particular embodiments, the posting user and/or the commenters may be able to confirm that the identified recommendations are correct. As an example and not by way of limitation, in response to a user inputting the comment "You should visit Parc Guell. It's lovely!," the social-networking system 160 may prompt a user to confirm that the identified object is being recommended in the comment, for example, by providing the user with the prompt "Would you like to recommend Parc Guell, Barcelona, Spain?" The user could then click on a confirmation element in the prompt to confirm that the recommendation is for "Parc Guell, Barcelona, Spain." Although this disclosure describes a posting user and/or commenters confirming that an identified recommendation is correct in a particular manner, this disclosure contemplates a posting user and/or commenters confirming that an identified recommendation is correct in any suitable manner.

In particular embodiments, when the social-networking system 160 does not automatically identify a recommendation, it may allow the user to manually specify a recommendation. As an example and not by way of limitation, in response to a user inputting the comment "You should check out the park with the Gaudi sculptures," the natural-language parser of the social-networking system 160 may fail to identify an object associated with the comment (e.g., because no entity of social graph 200 matches "Gaudi sculptures"). In this case, the social-networking system 160 may allow a user to specify an object for recommendation. As an example and not by way of limitation, the social-networking system 160 could provide the user with the prompt "Would you like to suggest a location in Barcelona?" along with a type-ahead process, as previously explained, to allow the user to specify a location (e.g., in response to such a prompt, the user could manually input "parc guell" and the social-networking system 160 may suggest an entity "Parc Guell, Barcelona"). Although this disclosure describes manually specifying particular recommendations in a particular manner, this disclosure contemplates manually specifying any suitable recommendations in any suitable manner.

Figure 6A:
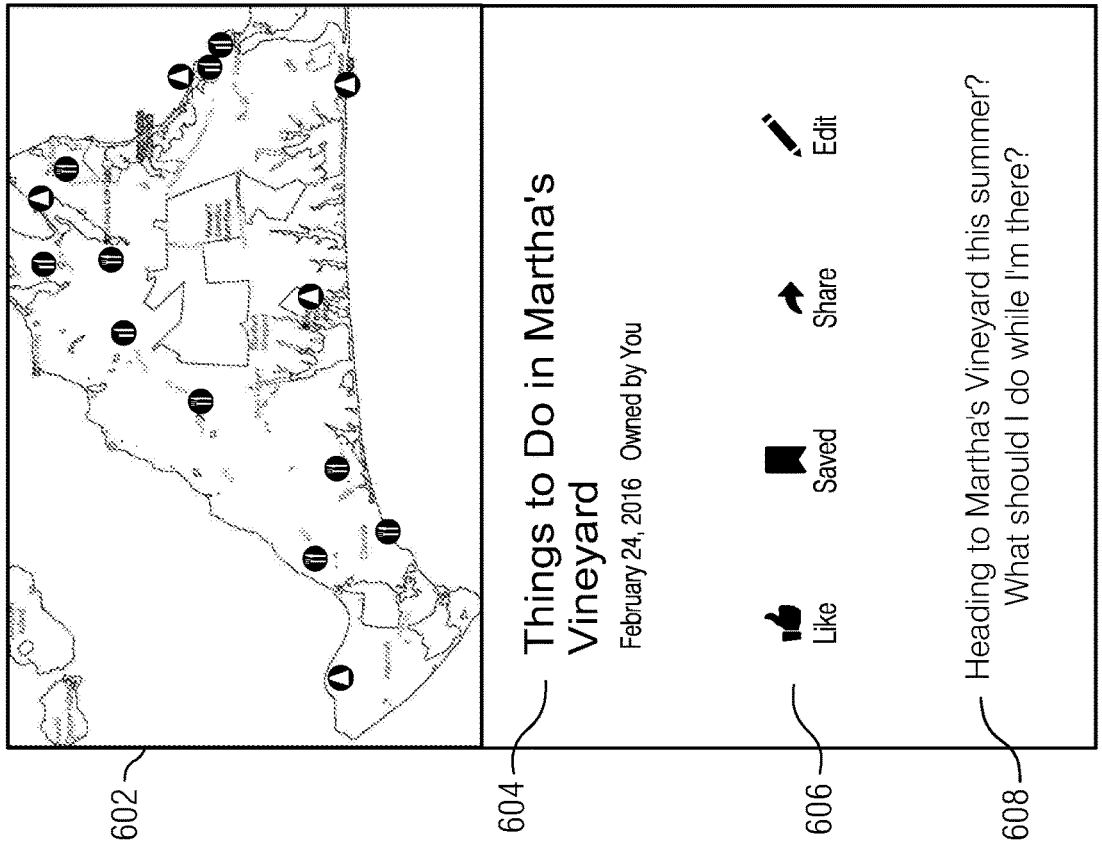
FIGS. 6A and 6B illustrate an example graphical interface for displaying a recommendation list, according to particular embodiments.

In particular embodiments, the social-networking system 160 may generate an aggregated recommendation list responsive to the query associated with the post. The list may include references to one or more of the identified objects referenced in the comments to the post. The aggregated recommendation list may be sent to the posting user, to one or more of the commenters, or to other users for display. In particular embodiments, the social-networking system 160 may generate a graphical interface for displaying the recommendation list. As an example and not by way of limitation, the recommendation list may be displayed in an user interface of the online social network, such as, for example, a newsfeed or user profile page. Examples of graphical interfaces displaying the recommendation list are shown in FIGS. 6 and 7. In particular embodiments, the graphical interface may further comprise a map displaying a location of one or more of the identified objects, an image associated with the identified query, additional content, such as, for example, a title or other text indicating that it is a recommendation list, other suitable content, or any combination thereof. As an example and not by way of limitation, FIG. 5B illustrates a recommendation list generated in response to the check-in post in Montreal, Quebec with the text "Just landed! What should I do?", where the recommendation list shows an image of Montreal, and the text "A list by Erica Virtue and 1 other", indicating that it is a recommendation list. Although this disclosure describes displaying particular recommendation lists in a particular manner, this disclosure contemplates displaying any suitable recommendation lists in any suitable manner.

Figure 6B:
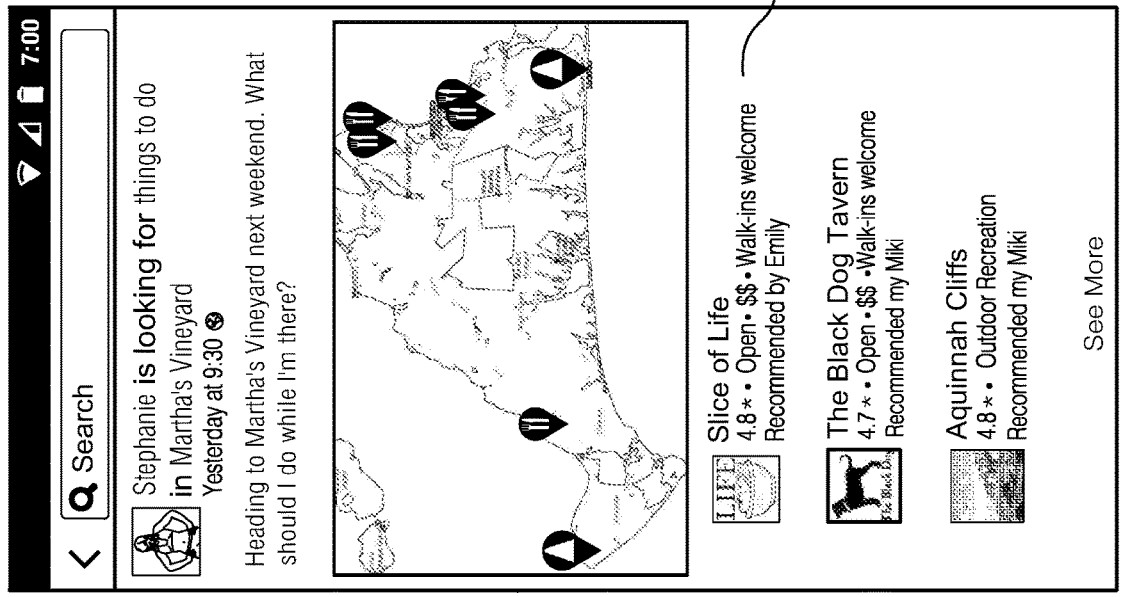

In particular embodiments, the social-networking system 160 may retrieve, for each identified object, content associated with the object. The content may include one or more of a rating associated with the object, an address associated with the object, a snippet associated with the object, a social context associated with the object, an image associated with the object, other suitable content associated with the object, or any combination thereof. The retrieved content associated with the object may be included in the aggregated recommendation list. FIG. 6B illustrates an interface with listed recommendations 610 including rating and complementary information associated with the identified object (e.g., hours, cost, reservation information, etc.). As an example and not by way of limitation, a recommendation for a restaurant called "Slice of Life" may include a rating (e.g., 4.8 out of 5 stars), restaurant hours or an indication that it is currently "Open," and whether reservations are required. A social context associated with the object may indicate which of a user's friends on the online social network have "liked," "checked-in," or "recommended" the object. As an example and not by way of limitation, a recommendation for The Montreal Biodome may include thumbnail profile pictures of a few friends in the online social network that have previously "checked-in" at The Montreal Biodome, as shown in element 702 of FIG. 7A. Snippets may display informational highlights of an object on the online social network, such as common words, phrases, or posts associated with the object. As an example and not by way of limitation, a snippet may indicate that that comments or posts throughout the online social network about the restaurant "Slice of Life" frequently mention the "apple pie." More information about snippets can be found in U.S. patent application Ser. No. 13/827,214, filed 14 Mar. 2013, U.S. patent application Ser. No. 14/797,819 filed on 13 Jul. 2015, and U.S. patent application Ser. No. 14/938,685 filed 11 Nov. 2015, each of which is incorporated by reference. Although this disclosure describes retrieving particular content for identified objects in a particular manner, this disclosure contemplates retrieving any suitable content for identified objects in any suitable manner.

Figure 7A:
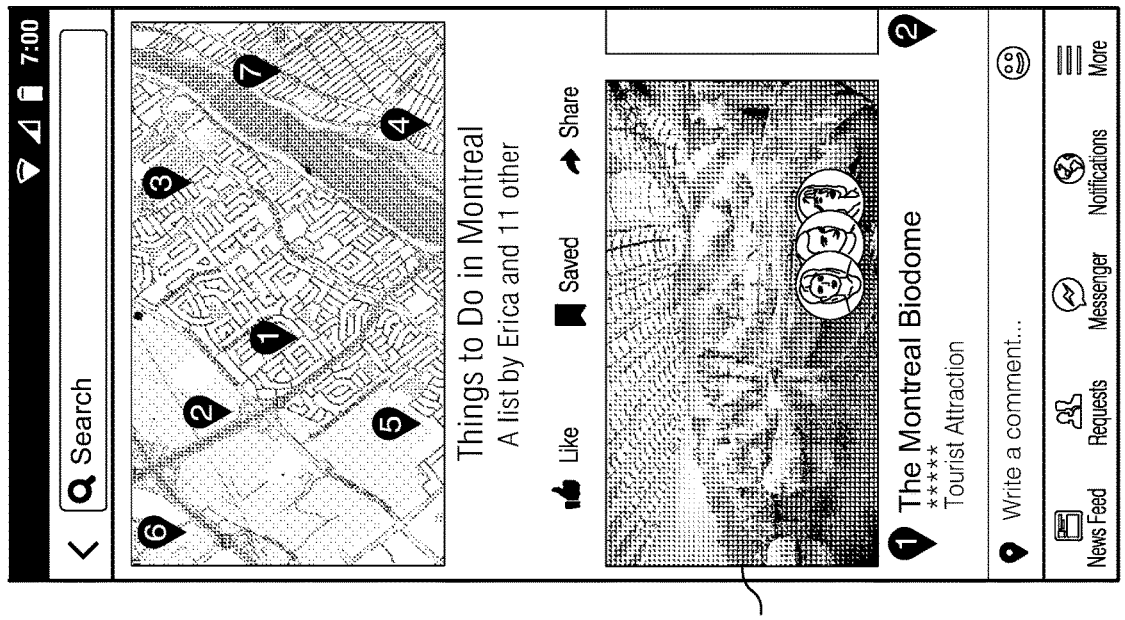
FIGS. 7A and 7B illustrate an example graphical interface for displaying a recommendation list and particular comments, according to particular embodiments.
Figure 7B:
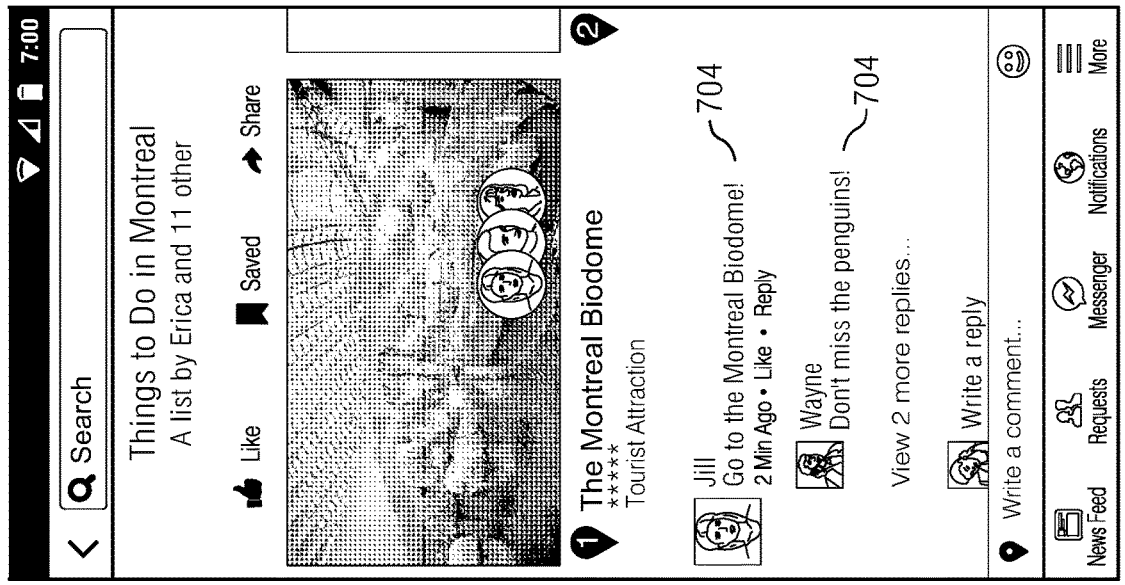

In particular embodiments, the graphical interface may further display one or more additional comments associated with one or more of the identified objects. The comments associated with an identified object may be displayed adjacent to the corresponding reference to the identified object. In particular embodiments, a graphical interface may display the recommendations as a scrollable set of cards 702, as illustrated in FIG. 7A. A user may scroll horizontally to navigate the list, which may contain complementary information or other content associated with the recommended objects. In particular embodiments, as shown in FIG. 7B, a user may scroll vertically to view comments associated with the particular recommendation. The additional comments may be comments responsive to a comment that recommended the particular object. As an example and not by way of limitation, the interface may display a card with the recommendation of "The Montreal Biodome," and when a user scrolls down the interface may show the comment that recommended the Biodome (e.g., the comment by the user "Jill A Nussbaum" that says "Go to the Montreal Biodome!") and additional comments related to the Biodome (e.g., "Don't miss the penguins!"). More information about cards can be found in U.S. patent application Ser. No. 14/258,821, filed 22 Apr. 2014, which is incorporated by reference. Although this disclosure describes displaying particular recommendation lists in a particular manner, this disclosure contemplates displaying any suitable recommendation lists in any suitable manner.

In particular embodiments, users of social-networking system 160 may view and interact with recommendation lists. The recommendation list may be displayed in the newsfeeds of the posting user's friends or other users of the social-networking system 160. Users may interact with the recommendation lists by adding, removing, sharing the lists, tagging other users to the list, or sharing ownership of the list, among others. In particular embodiments, a recommendation list may contain the options 606 illustrated in FIG. 6A that allow a user to "Like" the list, "Save" the list for later viewing, "Share" the list with other users of the online social network, or "Edit" the list by adding or removing referenced objects from the list. As an example and not by way of limitation, a user may decide that there are too many restaurants in the list, so the user may remove "The Black Dog Tavern" and add "South Beach." In particular embodiments, the posting user may authorize one or more other users as having viewing or editing rights to the recommendation list. As an example and not by way of limitation, referencing FIG. 6A, the user may access an access-control interface that allows the user to specify that the user's spouse and brother have editing rights to the recommendation list "Things to Do in Martha's Vineyard," and may further specify that the user's friends (i.e., first-degree connections of the user in social graph 200) have viewing rights to the recommendation list. Although this disclosure describes interacting with recommendation lists in a particular manner, this disclosure contemplates interacting with recommendation lists in any suitable manner.

In particular embodiments, the social-networking system 160 may rank the one or more identified objects. The identified object in the recommendation list may be ranked based on one or more factors, including, for example, social-network information associated with the objects, social signals (e.g., likes, check-ins, comments, posts, reshares, etc.) associated with the objects, ratings associated with the objects, social-graph affinities of the querying user with respect to the objects, other suitable factors, or any combination thereof. As an example and not by way of limitation, the objects recommendation list of "Things to Do in Montreal" in of FIGS. 7A and 7B may be numbered in descending order of "likes" associated with each object (e.g., the most "liked" objects first, the second most "liked" objects second, and so on). Although this disclosure describes raking identified objects in a particular manner, this disclosure contemplates ranking identified objects in any suitable manner.

In particular embodiments, the social-networking system 160 may send a notification to the first user when the first user is within a predetermined distance of one or more of the identified objects. As an example and not by way of limitation, referencing FIG. 6B, if one of the recommendations in a Martha's Vineyard list is the restaurant "Slice of Life," the social-networking system 160 may send a push notification (e.g., a text message saying "Slice of Life restaurant recommended by your friend Emily Lancaster is nearby") to the user's mobile device when the social-networking system 160 detects the user is located within 1 mile (i.e., the predetermined distance) of the restaurant. In particular embodiments, online social network users may "like" or "follow" one or more recommendation lists of other users, and the social-networking system 160 may likewise send them notifications when they are within a certain distance of recommended objects. As an example and not by way of limitation, the user's online social network friend Jill may press the "like" button associated with the Martha's Vineyard recommendation list, and at a later date receive a notification when the online social network detects she is within a predetermined distance of "The Black Dog Tavern" restaurant. Although this disclosure describes sending notifications in a particular manner, this disclosure contemplates sending notifications in any suitable manner.

In particular embodiments, the social-networking system 160 may maintain statistics and conduct data analysis of recommendations lists throughout the network to improve the detection and recommendation system. The social-networking system 160 may maintain data on how much each object in the online social network is recommended, what social interactions occur with recommended objects, what are the particular preferences of users based on social context, or how user users interact with recommendations lists, among others. As an example and not by way of limitation, referencing FIG. 6B, in response to a user requesting recommendations for Martha's Vineyard, the social-networking system 160 may first determine that the user enjoys the outdoors and the beach, based on the user's prior photos, text posts, and other social context. The social-networking system 160 may then determine what are the most recommended outdoors places in Martha's Vineyard, and place them at the top of the list (e.g., placing "South Beach," "Aquinnah Cliffs," and "Edgartown Lighthouse" at the top of the list.) Although this disclosure describes maintaining statistics and conducting data analysis in a particular manner, this disclosure contemplates maintaining statistics and conducting data analysis in any suitable manner.

Figure 8:
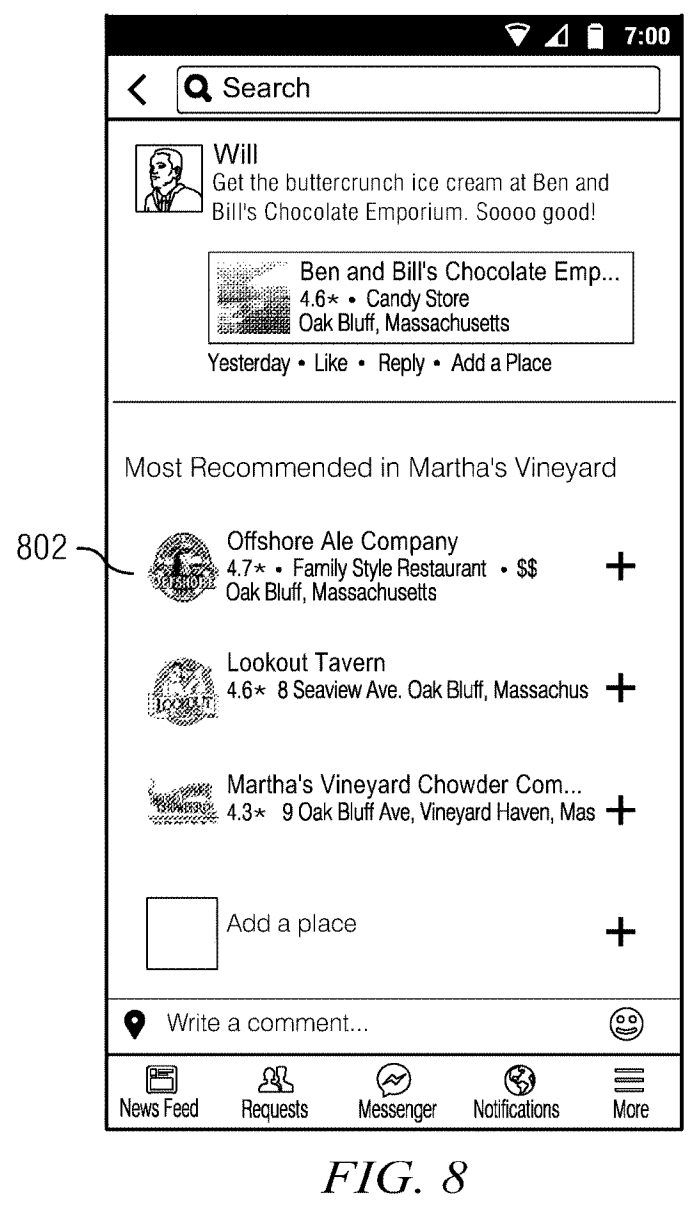

In particular embodiments, the social-networking system 160 may detect that a number of recommendations responsive to the query is below a threshold number of recommendations and may add one or more additional recommendations responsive to the query to the aggregated recommendation list. When a user posts a recommendation request but receives few or no comments, the social-networking system 160 may provide a list of default recommendations obtained from various sources, such as search engines, prior lists, or other social-network data. As an example and not by way of limitation, referencing FIG. 8, if fewer than three (i.e., the threshold number of recommendations) of the user's friends on the online social network have responded to the text post, the social-networking system 160 may determine recommendations responsive to the query based on social-network data. As illustrated in FIG. 8, the social-networking system 160 may add additional recommendations 802 to the aggregated recommendation list, which shows references to "Most Recommended" locations in Martha's Vineyard. Similarly, the additional recommendations 802 could include references to "Best Rated" locations, locations with "Most Check-ins", etc. In particular embodiments, the social-networking system 160 may determine responsive recommendations and may display them adjacent to the comments or other recommendations in the list. As an example and not by way of limitation, the default recommendations may be presented to the user immediately after the user submits the text post (e.g., in a reaction-card) so the user does not have to wait for his friends on the online social network to comment with their recommendations. Although this disclosure describes presenting default recommendations in a particular manner, this disclosure contemplates presenting default recommendations in any suitable manner.

In particular embodiments, the query identified in a post may be associated with a particular object of the online social network. As an example and not by way of limitation, referencing FIG. 6B, the social-networking system 160 may analyze the post text "Heading to Martha's Vineyard next weekend!" and determine it is associated with a query asking for recommendations for the island of Martha's Vineyard, which may be associated with a Martha's Vineyard entity object in the social-networking system 160 (which may be represented by a particular concept node 204 in social graph 200). In particular embodiments, the social-networking system 160 may determine one or more second users that have a social-graph affinity with respect to the particular object associated with the query that is above a predetermined threshold affinity, and then may send a notification to the one or more second users to provide an additional recommendation responsive to the query. As an example and not by way of limitation, if few or no users have responded with recommendations, the social-networking system 160 may send notifications to other users that are associated with or have interacted with the Martha's Vineyard object in the past, prompting them to provide recommendations (e.g., "Your friend Stephanie is asking for recommendations for Martha's Vineyard, leave a tip now!"). Although this disclosure describes prompting users to provide recommendations in a particular manner, this disclosure contemplates prompting users to provide recommendations in any suitable manner.

In particular embodiments, the social-networking system 160 may generate an itinerary referencing one or more of the identified objects based on information associated with the first user. The social-networking system 160 may use complementary data associated with the identified object, for example, hours/days of service, distance, etc. to create a day-by-day or hour-by-hour itinerary that plans out the trip for the user. As an example and not by way of limitation, the social-networking system 160 may generate a recommendation list for Martha's Vineyard in response to a user post, and then may create a week long itinerary that includes the recommended objects (e.g., Friday at 6 pm arrive at "[brandname] Hotel," Friday at 8 pm dinner at "Slice of Life" restaurant, Saturday at 10 am arrive at "South Beach," etc.). In particular embodiments, the social-networking system 160 may automatically create a travel itinerary based on the recommendations and other information obtained or inferred from social-network data, such as the user's tastes, budget, etc. As an example and not by way of limitation, social-network data or a social context associated with the user may indicate that the user likes museums, golfing, and pizza. The social-networking system 160 may then create a week long itinerary that allocates a few days and times to certain museums, a few days and times for golfing at a particular golf club, and a lunch or dinner at a particular pizza restaurant. Additionally, the online social network may use the lists to enable tasks such booking flights, hotels, entrance tickets, ride share or cab rides, reserving tables at restaurants, etc. Although this disclosure describes generating a travel itinerary in a particular manner, this disclosure contemplates generating the itinerary in any suitable manner.

In particular embodiments, the social-networking system 160 may include references to sponsored objects as part of a recommendation list. In this manner, the social-networking system 160 may use the recommendation lists as a means of selling and providing advertising. As an example and not by way of limitation, the "Slice of Life" restaurant in Martha's Vineyard may pay the social-networking system 160 to have its online social network object featured prominently on recommendation lists. As a result, the social-networking system 160 may rank the "Slice of Life" restaurant higher and place it before other objects on a recommendation list for Martha's Vineyard. Although this disclosure describes providing sponsored recommendations in a particular manner, this disclosure contemplates providing sponsored recommendations in any suitable manner.

Figure 9:
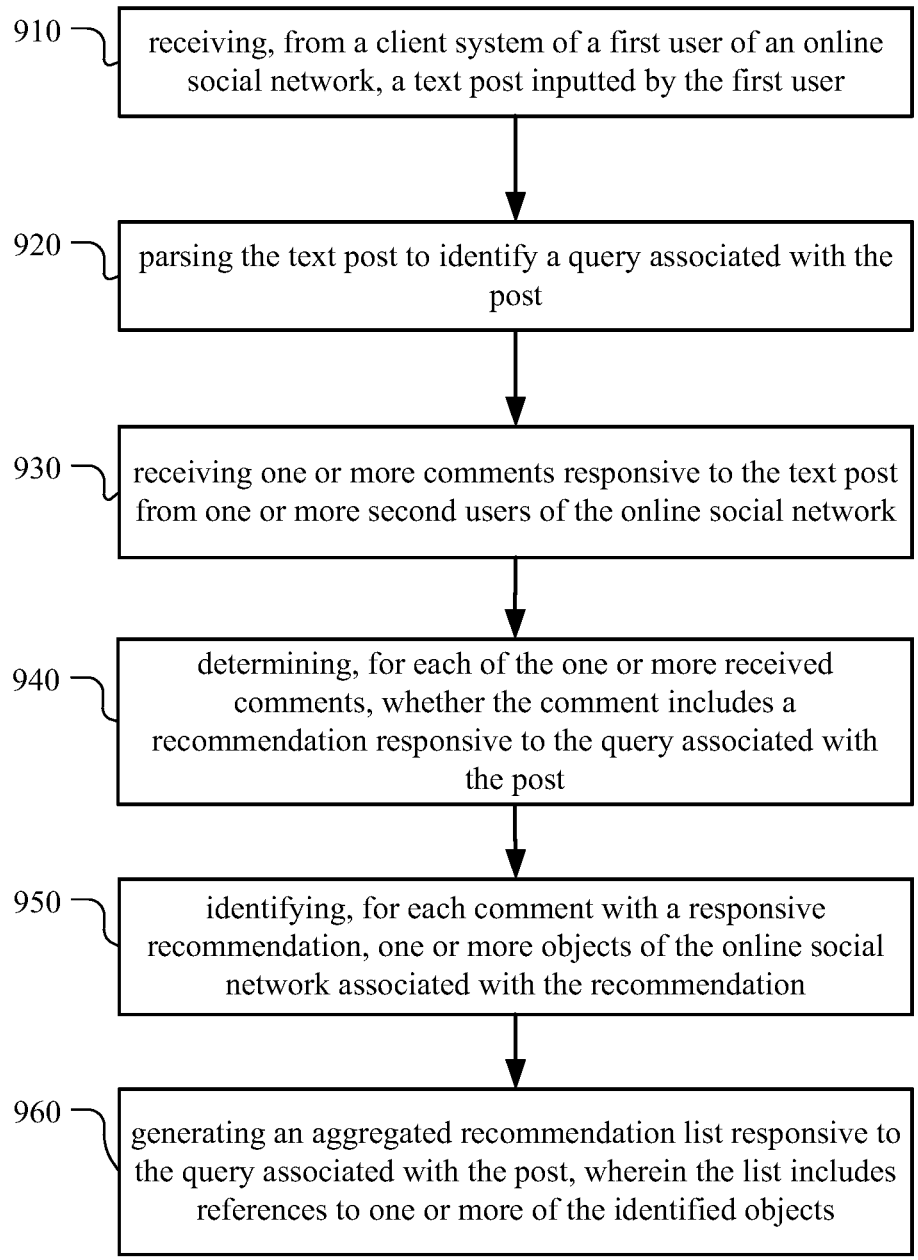
FIG. 9 illustrates an example method 900 for generating a list of recommendations based on a social network post and associated comments.

FIG. 9 illustrates an example method 900 for generating a list of recommendations based on an online social network post and associated comments. The method may begin at step 910, where the social-networking system 160 may receive, from a client system of a first user of an online social network, a text post inputted by the first user. At step 920, the social-networking system 160 may parse the text post to identify a query associated with the post. At step 930, the social-networking system 160 may receive one or more comments responsive to the text post from one or more second users of the online social network. At step 940, the social-networking system 160 may determine, for each of the one or more received comments, whether the comment includes a recommendation responsive to the query associated with the post. At step 950, the social-networking system 160 may identify, for each comment with a responsive recommendation, one or more objects of the online social network associated with the recommendation. At step 960, the social-networking system 160 may generate an aggregated recommendation list responsive to the query associated with the post, wherein the list includes references to one or more of the identified objects. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating a list of recommendations based on an online social network post and associated comments including the particular steps of the method of FIG. 9, this disclosure contemplates any suitable method for generating a list of recommendations based on an online social network post and associated comments including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Social Graph Affinity and Coefficient

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user may make frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 200, the social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Systems and Methods

Figure 10:
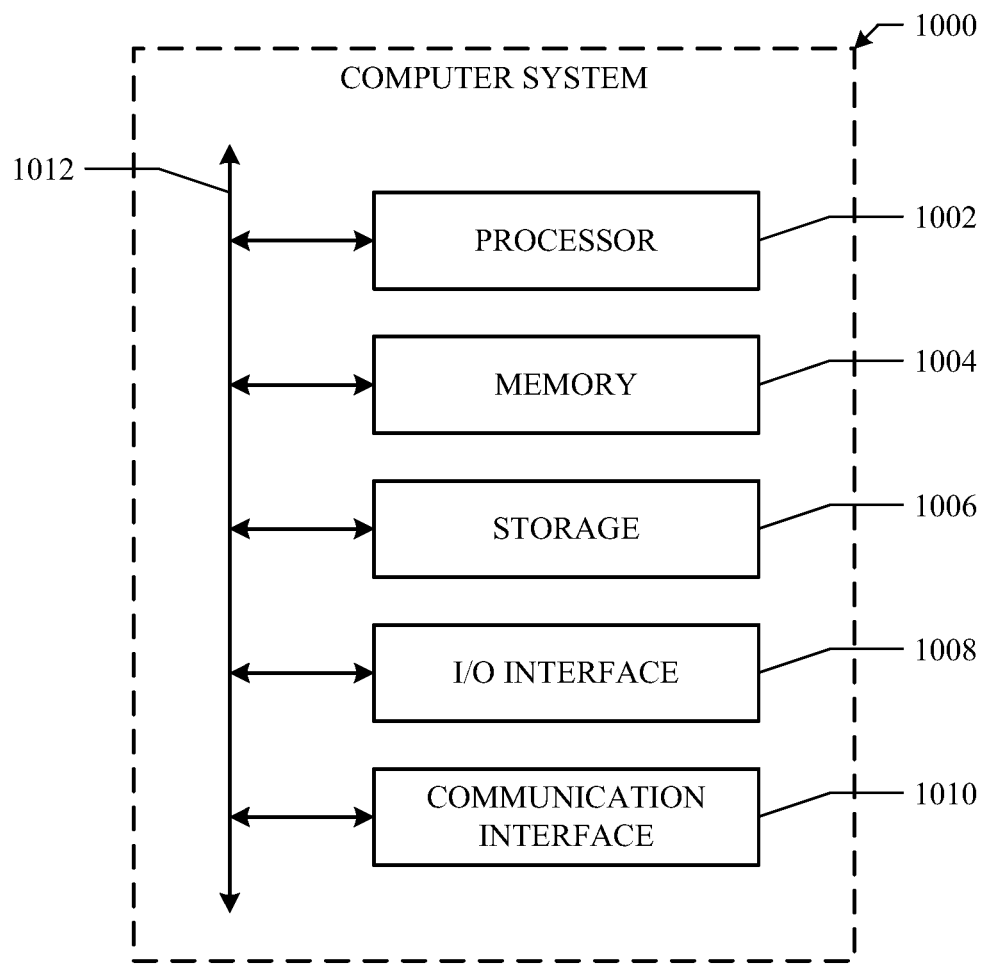
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a client system of a first user of an online social network:
    sending, to one or more computing devices of the online social network, a text post inputted by the first user for posting onto the online social network, wherein the text post is associated with a query;

receiving, from the one or more computing devices in response to the text post, an initial recommendation list responsive to the text post, wherein the initial recommendation list comprises references to one or more objects referenced in one or more prior comments associated with one or more prior posts of the online social network associated with the query, wherein each of the one or more prior comments includes a recommendation responsive to the query;

sending, to the one or more computing devices, a request for updates to the initial recommendation list of the text post; and receiving, from the one or more computing devices in response to the request, an updated recommendation list comprising references to one or more objects referenced in one or more new comments associated with the text post.

2. The method of claim 1, wherein each of the prior comments referenced in the initial recommendation list or each of the new comments referenced in the updated recommendation list has a score based on social signals associated with the prior comment.

3. The method of claim 2, wherein the social signals comprise one or more of author information or location information associated with the respective comment.

4. The method of claim 2, wherein each of the prior comments referenced in the initial recommendation list or each of the new comments referenced in the updated recommendation list has a score greater than a threshold score.

5. The method of claim 2, wherein the prior comments referenced in the initial recommendation list or the new comments referenced in the updated recommendation list are ranked based on their respective scores.

6. The method of claim 1, wherein each of the prior and new comments is responsive to the query associated with the post.

7. The method of claim 1, wherein the query is associated with one or more topics and one or more query-domains that match the query.

8. The method of claim 1, wherein one or more of the initial recommendation list or the updated recommendation list comprises an expandable thread user interface for at least one of the prior comments of the initial recommendation list or the new comments of the updated recommendation list.

9. The method of claim 8, further comprising:
receiving a user input selecting an expand command associated with the expandable thread user interface; and
displaying, responsive to the user input, the post and the respective comment in response to user selection of the expand command.

10. The method of claim 1, wherein the updated recommendation list comprises, for each object referenced in the new comments associated with the text post, one or more of a rating associated with the object, an address associated with the object, a social context associated with the object, or an image associated with the object.

11. The method of claim 1, further comprising:
receiving, from the one or more computing devices, instructions for presenting a user interface comprising one or more of the initial recommendation list or the updated recommendation list, wherein the user interface further comprises a map displaying a location of the one or more objects referenced in the respective comments.

12. The method of claim 1, further comprising:
receiving, from the one or more computing devices, instructions for presenting a user interface comprising one or more of the initial recommendation list or the updated recommendation list, wherein the user interface further comprises an image associated with the query.

13. The method of claim 1, further comprising:
receiving, from the one or more computing devices, instructions for presenting a user interface comprising one or more of the initial recommendation list or the updated recommendation list, wherein the user interface further comprises one or more additional comments associated with one or more objects referenced in the respective comments adjacent to the corresponding one or more references to the respective objects.

14. The method of claim 1, further comprising:
receiving one or more characters inputted into a composer interface to generate the text post inputted by the first user; and
receiving, responsive to the received one or more characters, a prompt listing one or more of the potential queries to the first user for selection.

15. The method of claim 1, further comprising:
receiving a notification when the client system is within a predetermined distance of one or more of the objects referenced in one or more of the initial recommendation list or the updated recommendation list.

16. The method of claim 1, wherein sending the request for updates to the initial recommendation list is responsive to detecting that a number of recommendations responsive to the query is below a threshold number of recommendations.

17. The method of claim 1, further comprising:
receiving an itinerary referencing one or more objects referenced in the prior comments referenced in the initial recommendation list or the new comments referenced in the updated recommendation list.

18. One or more computer-readable non-transitory storage media embodying software that is operable when executed to:
send, to one or more computing devices of the online social network, a text post inputted by the first user for posting onto the online social network, wherein the text post is associated with a query;
receive, from the one or more computing devices in response to the text post, an initial recommendation list responsive to the text post, wherein the initial recommendation list comprises references to one or more objects referenced in one or more prior comments associated with one or more prior posts of the online social network associated with the query, wherein each of the one or more prior comments includes a recommendation responsive to the query;
send, to the one or more computing devices, a request for updates to the initial recommendation list of the text post; and
receive, from the one or more computing devices in response to the request, an updated recommendation list comprising references to one or more objects referenced in one or more new comments associated with the text post.

19. A system comprising: one or more processors; and a non-transitory memory coupled to the processors comprising instructions executable by the processors, the processors operable when executing the instructions to:

send, to one or more computing devices of the online social network, a text post inputted by the first user for posting onto the online social network, wherein the text post is associated with a query;

receive, from the one or more computing devices in response to the text post, an initial recommendation list responsive to the text post, wherein the initial recommendation list comprises references to one or more objects referenced in one or more prior comments associated with one or more prior posts of the online social network associated with the query, wherein each of the one or more prior comments includes a recommendation responsive to the query;

send, to the one or more computing devices, a request for updates to the initial recommendation list of the text post; and receive, from the one or more computing devices in response to the request, an updated recommendation list comprising references to one or more objects referenced in one or more new comments associated with the text post.

\* \* \* \* \*